US011380886B2

(12) United States Patent
Manthiram et al.

(10) Patent No.: US 11,380,886 B2
(45) Date of Patent: Jul. 5, 2022

(54) MULTIPHASE METAL FOILS AS INTEGRATED METAL ANODES FOR NON-AQUEOUS BATTERIES

(71) Applicant: BOARD OF REGENTS, THE UNIVERSITY OF TEXAS SYSTEM, Austin, TX (US)

(72) Inventors: Arumugam Manthiram, Austin, TX (US); Karl Joseph Kreder, III, Austin, TX (US); Brian Theodore Heligman, Potomac, MD (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 86 days.

(21) Appl. No.: 16/607,942

(22) PCT Filed: Apr. 30, 2018

(86) PCT No.: PCT/US2018/030121
§ 371 (c)(1),
(2) Date: Oct. 24, 2019

(87) PCT Pub. No.: WO2018/201125
PCT Pub. Date: Nov. 1, 2018

(65) Prior Publication Data
US 2020/0365877 A1 Nov. 19, 2020

Related U.S. Application Data

(60) Provisional application No. 62/491,653, filed on Apr. 28, 2017.

(51) Int. Cl.
*H01M 4/36* (2006.01)
*H01M 4/38* (2006.01)
(Continued)

(52) U.S. Cl.
CPC ............ *H01M 4/364* (2013.01); *C22C 13/00* (2013.01); *C22C 21/003* (2013.01);
(Continued)

(58) Field of Classification Search
CPC ............ H01M 4/36; H01M 4/48; H01M 4/40; H01M 4/46; H01M 4/04
See application file for complete search history.

(56) References Cited

U.S. PATENT DOCUMENTS 3,982,960 A * 9/1976 Hoekje ................... H01M 4/00
429/199
6,432,586 B1 * 8/2002 Zhang .................. H01M 50/411
429/251

(Continued)

FOREIGN PATENT DOCUMENTS

CN 101276942 A 10/2008
CN 105244489 A 1/2016
(Continued)

OTHER PUBLICATIONS

International Search Report and Written Opinion in PCT/US2018/030121, dated Sep. 18, 2018. 11 pages.
(Continued)

*Primary Examiner* — Kenneth J Douyette
(74) *Attorney, Agent, or Firm* — Kilpatrick Townsend & Stockton LLP

(57) ABSTRACT

Disclosed herein are multiphase metal anodes useful in non-aqueous batteries. The anodes include at least one active metal and at least one conductive metal.

20 Claims, 14 Drawing Sheets

(51) Int. Cl.
  *H01M 4/40* (2006.01)
  *H01M 4/46* (2006.01)
  *C22C 13/00* (2006.01)
  *C22C 21/00* (2006.01)
  *H01M 4/04* (2006.01)
  *H01M 10/0525* (2010.01)
  *H01M 4/02* (2006.01)

(52) U.S. Cl.
  CPC ....... *H01M 4/0402* (2013.01); *H01M 4/0485* (2013.01); *H01M 4/0488* (2013.01); *H01M 4/387* (2013.01); *H01M 4/405* (2013.01); *H01M 4/463* (2013.01); *H01M 10/0525* (2013.01); *H01M 2004/027* (2013.01)

(56) References Cited

U.S. PATENT DOCUMENTS

| | | | | |
|---|---|---|---|---|
| 2004/0219428 | A1* | 11/2004 | Nagayama | H01M 10/0413 429/218.1 |
| 2005/0175900 | A1* | 8/2005 | Yasuda | H01M 4/387 429/231.95 |
| 2006/0093921 | A1* | 5/2006 | Scott | H01M 50/116 429/245 |
| 2006/0139850 | A1* | 6/2006 | Rorvick | H01G 9/042 361/508 |
| 2008/0241687 | A1 | 10/2008 | Ishii et al. | |
| 2012/0135142 | A1* | 5/2012 | Yang | B22F 5/006 427/247 |
| 2012/0171574 | A1* | 7/2012 | Zhamu | H01M 4/364 429/300 |
| 2014/0162085 | A1* | 6/2014 | Seki | H01G 11/68 428/606 |
| 2014/0255793 | A1 | 9/2014 | Zhang et al. | |
| 2015/0318544 | A1 | 11/2015 | Yu et al. | |
| 2016/0049655 | A1* | 2/2016 | Fasching | H01M 4/131 429/221 |

FOREIGN PATENT DOCUMENTS

| | | |
|---|---|---|
| JP | H08-50922 A | 2/1996 |
| JP | 2009-016245 A | 1/2009 |
| JP | 2009-211936 A | 9/2009 |
| JP | 2010-140885 A | 6/2010 |
| JP | 2013-187114 A | 9/2013 |
| JP | 2014-197497 A | 10/2014 |
| JP | 2017-071804 A | 4/2017 |
| WO | 2013-052456 A1 | 4/2013 |
| WO | 2013052456 A1 | 4/2013 |
| WO | 2018090097 A1 | 5/2018 |

OTHER PUBLICATIONS

"Lithium Insertion in Carbonaceous Materials Containing Silicon". Wilson. Mar. 1997; p. 26 para 2, p. 8 para 6.
Renzong Hu, China Master's Theses Full-text Database, V.12, C042-55, 2011.
Yong Lian, et al., Mechanical Engineering Materials and Forming Process, 1st edition, p. 18, 2015.
International Preliminary Report on Patentability dated Oct. 29, 2019 in International Patent Application No. PCT/US2018/030121, 7 pages.
Formality Examination Office Action dated Mar. 30, 2020 in Japan Application No. 2019-558712, 6 pages.
Office Action dated Feb. 28, 2022 in Japan Application No. 2019-558712, 8 pages.
Office Action dated Oct. 11, 2021 in China Application No. 201880027911.X, 12 pages.
Partial Supplementary European Search Report dated Nov. 11, 2020 in European Patent Application No. 18791773.7, 15 pages.
Extended European Search Report dated Feb. 11, 2021 in European Patent Application No. 18791773.7, 11 pages.
Hu, et al., "Influences of Composition on the Electrochemical Performance in Immiscible Sn-Al Thin Films as Anodes for Lithium Ion Batteries", The Journal of Physical Chemistry C, 2009, pp. 18953-18961, vol. 113, No. 43, DOI: 10.1021/jp9076257.
Wang, et al., "Preparation and electrochemical properties of binary SixSb immiscible alloy for lithium ion batteries", Journal of Alloys and Compounds, 2014, pp. 308-314, vol. 610, https://doi.org/10.1016/j.jallcom.2014.05.034.
Wang, et al., "Lithium Storage Characteristics and Electrochemical Performance of Si-Sb-Ag Composite Anode Materials" Int. J. Electrochem Sci. International Journal, 2015, pp. 9652-96665, Retrieved from internet: URL http://www.electrochemsci.org/papers/vol 10/101109652.pdf.

* cited by examiner

MULTIPHASE METAL FOILS AS INTEGRATED METAL ANODES FOR NON-AQUEOUS BATTERIES

CROSS REFERENCE TO RELATED APPLICATIONS

This application is a national stage application filed under 35 U.S.C. § 371 of PCT/US2018/030121, filed Apr. 30, 2018, which claims the benefit of priority to U.S. Provisional Application No. 62/491,653, filed, Apr. 28, 2017, the contents of each are incorporated herein by reference in their entireties.

STATEMENT OF GOVERNMENT SUPPORT

This invention was made with government support under Grant no. DE-SC0005397 awarded by the Department of Energy. The government has certain rights in the invention.

FIELD OF THE INVENTION

This invention is directed to multiphase metal foil alloys anodes for use in non-aqueous batteries, for instance lithium-ion, sodium ion, calcium-ion and magnesium ion batteries.

BACKGROUND

Although, rechargeable non-aqueous lithium ion batteries (LIBs) are ubiquitous, ranging from consumer electronics to electric vehicles, the current technology needs to be further improved to meet future demand. To this end, recent research has focused on improving the gravimetric energy density of LIBs graphite anodes through the addition of alloying compounds such as silicon, tin, germanium, and aluminum. Unfortunately, efforts to increase energy density by adding higher theoretical capacity alloying compounds have been met with limited success due to the low weight percentages (<10 wt. %) that can be successfully added without significantly compromising first cycle coulombic efficiency, rate capability, and cyclability. In an attempt to address the volume change, some studies have investigated thin films or composites of binary powders such as Al—Sn, Sn—Sb, and Ag—Sn. The powders benefited from having nano-sized alloying materials intimately mixed with a conducting matrix.

An alternate route to increase gravimetric density has been to investigate materials which can act as both the active material and the current collector. These investigations have been primarily limited to either aluminum, or tin, due to the high ductility of the materials, which is required to produce foils. These investigations have had limited impact due to poor cyclability, low coulombic efficiency, or low realized/utilized capacity. Many of these studies have concluded that poor cyclability of the foils made from lithium alloying metals is due to large volume changes (>200%) with cycling and/or undesired reactions with the electrolyte.

SUMMARY

Disclosed herein are integrated metal foil anode (IMFA) including multiphase metallic system of at least one active material and a conductive metal. The IMFA removes the need for separate inactive copper foil current collector, thereby allowing a dramatic increase in the effective capacity (from 150 maAh/g to ≤300 mAh/g) while decreasing volume expansion. In addition to lithium-ion chemistries, the disclosed anodes can be advantageously deployed in other alkali metal and alkaline earth metal systems, for instance sodium-ion, calcium ion, and magnesium-ion batteries.

The details of one or more embodiments are set forth in the descriptions below. Other features, objects, and advantages will be apparent from the description and from the claims.

BRIEF DESCRIPTION OF THE FIGURES

FIG. 1 depicts SEM micrographs and EDX elemental maps of both AT (aluminum-tin) and AZT (aluminum-zinc-tin) alloys before and after rolling. Specifically, SEM micrographs and EDX elemental maps of the AT50, AT60, AT70, AZT50, AZT60, and AZT70 as cast ingots. SEM micrographs and EDX elemental maps of the AT50, AT60, AT70, AZT50, AZT60, and AZT70 alloy foils. Tin is shown as red, aluminum as green, and zinc as blue in EDX elemental maps.

DETAILED DESCRIPTION

Figure 1A:
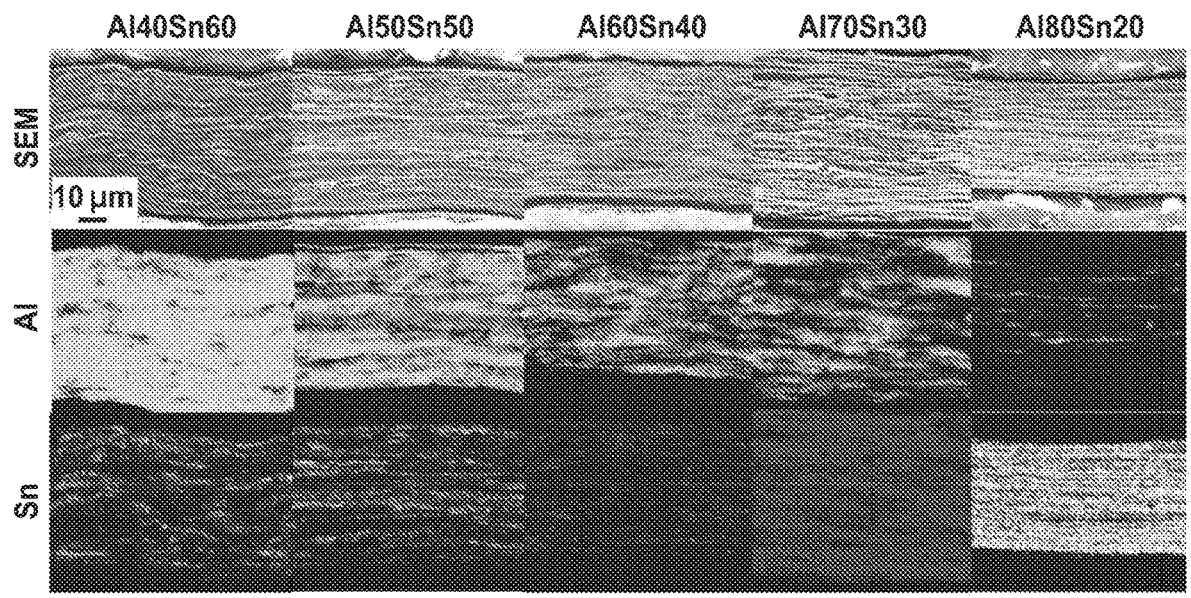
FIG. 1A depicts multiphase systems dispersed across the z-y plane.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As used herein, the term "lithium alloying potential" refers to the ability of a given metal to reduce lithium ion to solid lithium metal. Lithium alloying potential is measured relative to lithium metal itself. Likewise, "sodium alloying potential" refers to the ability of a given metal to reduce sodium ion to solid sodium metal, and "magnesium alloying potential" refers to the ability of a given metal to reduce magnesium ion to magnesium metal. Sodium alloying potential is measured relative to sodium metal itself, and magnesium alloying potential is measured relative to magnesium metal itself. Alloying potentials of other alkali metals and alkaline earth metals may be measured in analogous fashion.

Disclosed herein are multiphase metallic foils for use as anodes in non-aqueous batteries, for instance alkali metal systems and alkaline earth metal systems. As used herein, the term alkali metal system refers to a cell in which the electrolyte includes at least one alkali metal, e.g., lithium, sodium, potassium, rubidium or cesium. The term alkaline earth metal system refers to a cell in which the electrolyte includes at least one alkaline earth metal, e.g. beryllium, magnesium, calcium, strontium, or barium.

The foils include at least one active metal and at least one conductive metal. The active metal alloys an alkali metal or an alkaline earth metal more readily that the conductive metal. In some embodiments both the active metal and conductive metal are, at least, theoretically capable of alloying the same alkali metal or alkaline earth metal. The active metal is distinguished from the conductive metal in the active metal has a higher alloying potential for an electrolyte than the conductive metal. For instance, when employed in a lithium-ion battery, the active metal will have a higher lithium alloying potential than the conductive metal. Likewise, when employed in a sodium ion battery, the active metal will have a higher sodium alloying potential than the conductive metal, and when employed in a magnesium ion battery, the active metal will have a higher magnesium alloying potential than the conductive metal. Due to the differences in alloying potential between the active metal and conductive metal, As such, when the anode is utilized in an electrical cell operating over a defined voltage, only the active metal can alloy with the electrolyte. The conductive metal, which is substantially not alloyed, remains ductile and contributes to the cyclability and efficiency of the anode.

Typically the active metal will alloy the alkali metal or alkaline earth metal at a voltage from 0.01 V to 1.0 V, for instance from 0.025 V to 0.85 V, from 0.05 V to 0.85 V, from 0.1 V to 0.85 V, from 0.2 V to 0.85 V, from 0.3 V to 0.85 V, from 0.4 V to 0.85 V, from 0.5 V to 0.85 V, from 0.6 V to 0.85 V, 0.025 V to 0.6 V, from 0.05 V to 0.6 V, from 0.1 V to 0.6 V, from 0.2 V to 0.6 V, from 0.3 V to 0.6 V, from 0.4 V to 0.6 V, from 0.5 V to 0.6 V, 0.025 V to 0.5 V, from 0.05 V to 0.5 V, from 0.1 V to 0.5 V, from 0.2 V to 0.5 V, from 0.3 V to 0.5 V, from 0.4 V to 0.5 V, 0.025 V to 0.4 V, from 0.05 V to 0.4 V, from 0.1 V to 0.4 V, from 0.2 V to 0.4 V, or from 0.3 V to 0.4 V.

The following table lists several metals suitable for use in multiphase metallic anodes in lithium systems. The lithium-alloying potential (measured relative to lithium metal) of several of the metals is also provided:

| Alloying Anodes | Theo. Capacity | Lithium-Alloying Potential | | | |
|---|---|---|---|---|---|
| Al | 993 | 0.19 | | | |
| Si | 3579 | 0.07 | 0.22 | 0.49 | |
| Zn | 410 | 0.06 | 0.19 | 0.21 | |
| Ga | 769 | 0.25 | 0.52 | 0.82 | |
| Ag | 248 | 0.04 | 0.1 | 0.26 | 0.38 |
| Cd | 238 | | | | |
| In | 1012 | | | | |
| Sn | 960 | 0.4 | 0.57 | 0.69 | |
| Sb | 660 | 0.78 | 0.83 | 0.99 | |
| Au | 510 | | | | |
| Pb | 550 | 0.35 | | | |
| Bi | 385 | 0.73 | 0.78 | | |
| Mg | 195 | 0.24 | | | |

The following table lists several metals suitable for use in multiphase metallic anodes in sodium systems. The sodium-alloying potential (measured relative to sodium metal) of several of the metals is also provided:

| Alloying Anodes | Theo. Capacity | Sodium Alloying Potential | | | |
|---|---|---|---|---|---|
| Ga | 217 | | | | |
| Ag | 124 | | | | |
| Cd | 596 | | | | |
| In | 467 | | | | |
| Sn | 847 | 0.2 | 0.3 | 0.57 | 0.69 |
| Sb | 660 | 0.78 | | | |
| Au | 272 | | | | |
| Pb | 485 | 0.12 | 0.183 | 0.37 | 0.51 |
| Bi | 385 | 0.4 | 0.6 | | |

The following table lists several metals suitable for use in multiphase metallic anodes in magnesium systems. The magnesium-alloying potential (measured relative to magnesium metal) of several of the metals is also provided:

| Alloying Anodes | Theo. Capacity | Magnesium Alloying Potential |
|---|---|---|
| Al | 2814 | |
| Si | 3817 | 0.15 |
| Zn | 820 | |
| Ga | 1922 | |
| Ag | 1491 | |
| Cd | 1430 | |
| Sn | 903 | 0.15 |
| Sb | 293 | 0.32 |
| Pb | 517 | |
| Bi | 385 | 0.23 |

When the multiphase metallic anode includes, as both the active metal and conductive metal, two different metals that can both alloy an alkali metal or an alkaline earth metal, the active metal will be the one with the higher alloying potential. For instance, in an anode for a lithium cell including tin and bismuth, tin would be the conductive metal, whereas in an anode including tin and lead, tin would be the active metal. In the tin/bismuth system, if the operating voltage is maintained greater than 0.69 V, only bismuth, and not tin, would be alloyed.

Accordingly, for some embodiments of the invention, the active metal includes aluminum, germanium, silicon, zinc, gallium, silver, cadmium, indium, tin, antimony, gold, lead, bismuth, or magnesium. Tin, bismuth, and lead are preferred active metals.

In some embodiments, the conductive metal can include nickel, aluminum, zinc, silicon, magnesium, lead, germanium, bismuth, silver, cadmium, antimony, copper, or gold. Aluminum, zinc, tin, lead, and copper are preferred conductive metals.

In some embodiments, the multiphase metallic anode includes tin and aluminum, tin and zinc, bismuth and tin, tin and lead, lead and copper, or tin and copper.

The active and conductive metals can be present in differing weight ratios, for instance, the weight ratio of active metal to conductive metal can be from 1:10 to 10:1, from 1:10 to 5:1, from 1:5 to 5:1, from 1:2.5 to 5:1, from 1:2.5 to 2.5:1, from 1:1 to 2.5:1, from 1:2.5 to 1:1, or 1:1.5 to 1.5:1.

In certain embodiments, the multiphase metal anode can include at least one additional element, different than the active metal and conductive metal. For instance, the additional element can be boron, carbon, aluminum, silicon, phosphorous, gallium, germanium, arsenic, indium, antimony, lead, tin, bismuth, titanium, vanadium, chromium, manganese, iron, cobalt, nickel, copper, zinc, yttrium, zirconium, niobium, molybdenum, technetium, ruthenium, rhodium, palladium, silver, cadmium, tungsten, osmium, iridium, platinum, gold, and combinations thereof.

The additional element(s) can be present in the active metal phase, meaning it is directly contacting active metal, and not conductive metal. The additional element(s) can be present in the conductive metal phase, meaning it is directly contacting conductive metal, and not active metal. In certain cases, one or more additional elements can be present in the active metal phase, and one or more additional elements, which can be the same or different as those in the active metal phase, can be present in the conductive phase.

The additional element(s) can be present in the form of nanoparticles, solid solutions, or intermetallic compounds. The nanoparticles can have an average particle size from 1-1,000 nm, from 10-1,000 nm, 50-1,000 nm, 100-1,000 nm, 250-1,000 nm, 500-1,000 nm, 750-1,000 nm, 1-750 nm, 10-750 nm, 50-750 nm, 100-750 nm, 250-750 nm, 500-750 nm, 1-500 nm, 10-500 nm, 50-500 nm, 100-500 nm, or 250-500 nm.

The one or more additional elements can be present in an amount from 0.1-10%, from 0.5-10%, from 1.0-10%, from 2.5-10%, from 5.0-10%, from 7.5-10%, from 0.1-7.5%, from 0.1-5.0%, from 0.1-3.5%, from 0.1-2.5%, from 0.1-1.0%, from 1-7.5%, from 2.5-7.5%, from 2-5%, or from 2.5-4% by weight, relative to the total weight of the metals.

In some embodiments, the one or more additional elements can include either zinc or copper, or both zinc and copper.

The multiphase metallic foil can be a eutectic mixture, a clad system or a deposited system. Eutectic mixtures can be obtained by mixing the metals together in a liquid state (optionally along with the one or more additional elements as described above), followed by forming a solid ingot from the mixture. The one or more additional elements need not be in the liquid state, for instance if they have a higher melting point than the eutectic mixture. Clads can be obtained by intertwining wires of active and conductive metal together, and forcing them together via mechanical force. Active metal can be deposited onto a conductive metal by a variety of means, for instance by electrodeposition or electroless deposition, or by tinning.

Figure 1B:
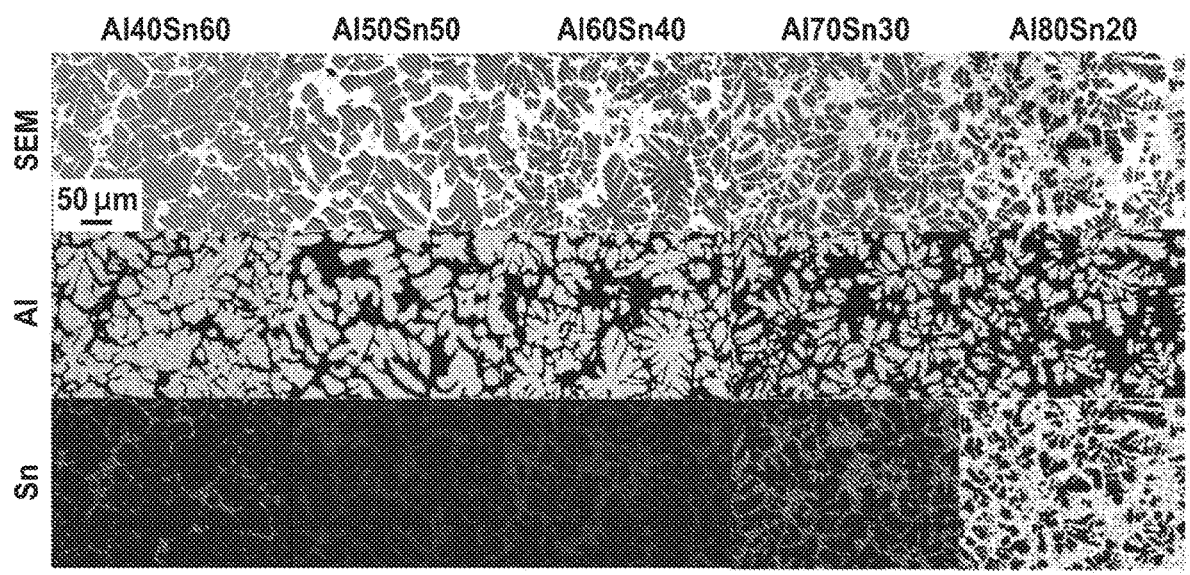
FIG. 1B depicts multiphase systems showing metals dispersed across the x-y plane.
Figure 2:
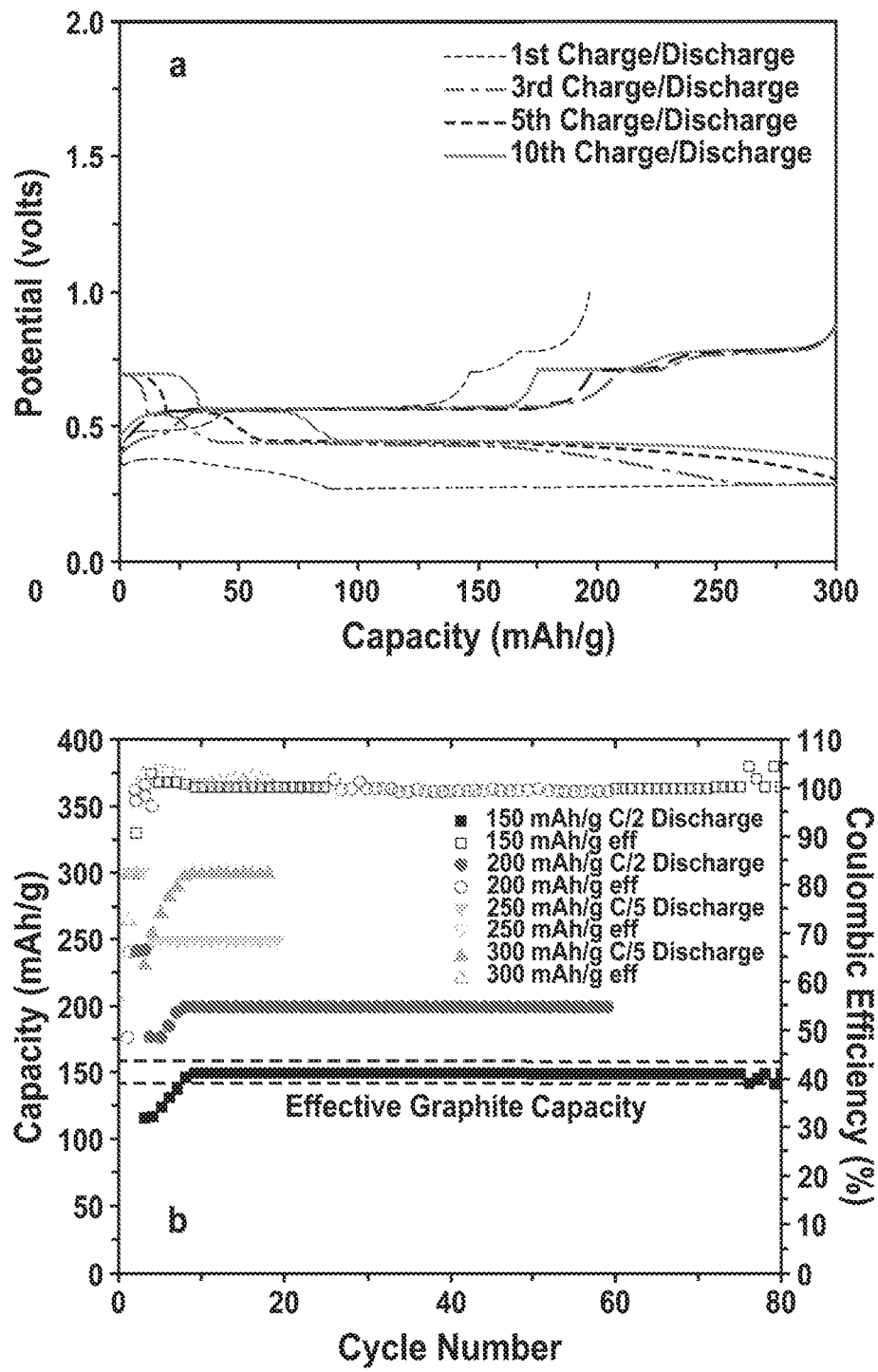
FIG. 2 depicts electrochemical performance of AZT anodes: (a) Galvanostatic voltage response of AZT70 alloy at C/10 during 300 mAh/g capacity limited cycling. (b) Cyclability of the AZT70 alloy at multiple rates and multiple capacity ranges in lithium half-cell.
Figure 3:
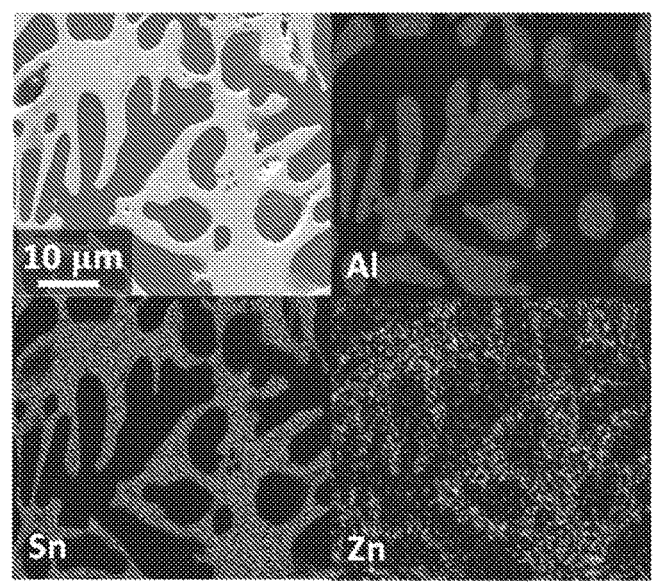
FIG. 3 depicts a high magnification SEM of AZT70 and corresponding EDX elemental map.
Figure 4:
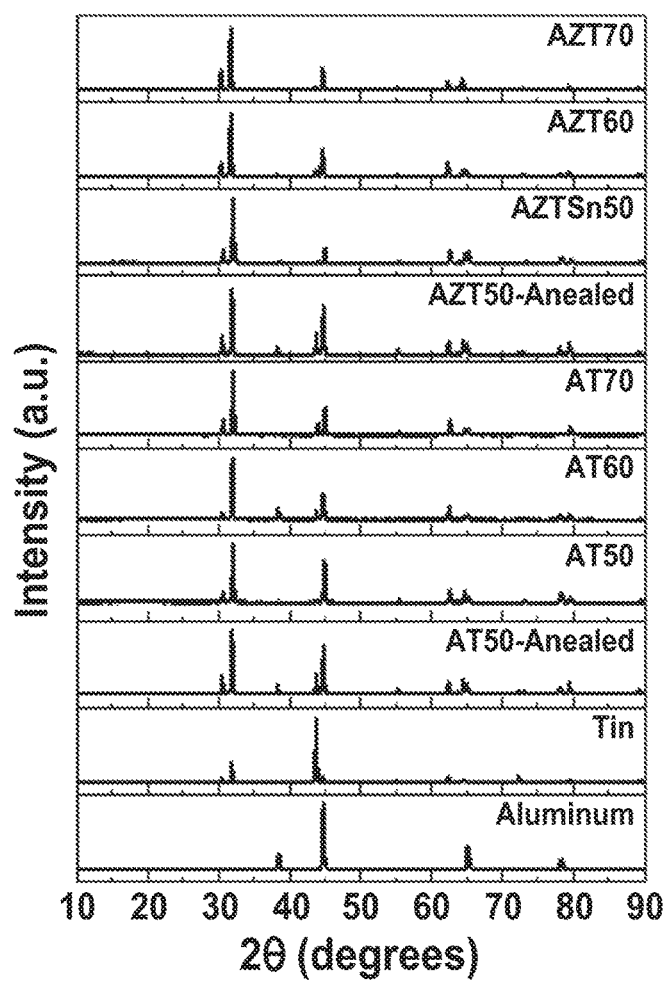
FIG. 4 depicts XRD patterns of various AT and AZT alloys.
Figure 5:
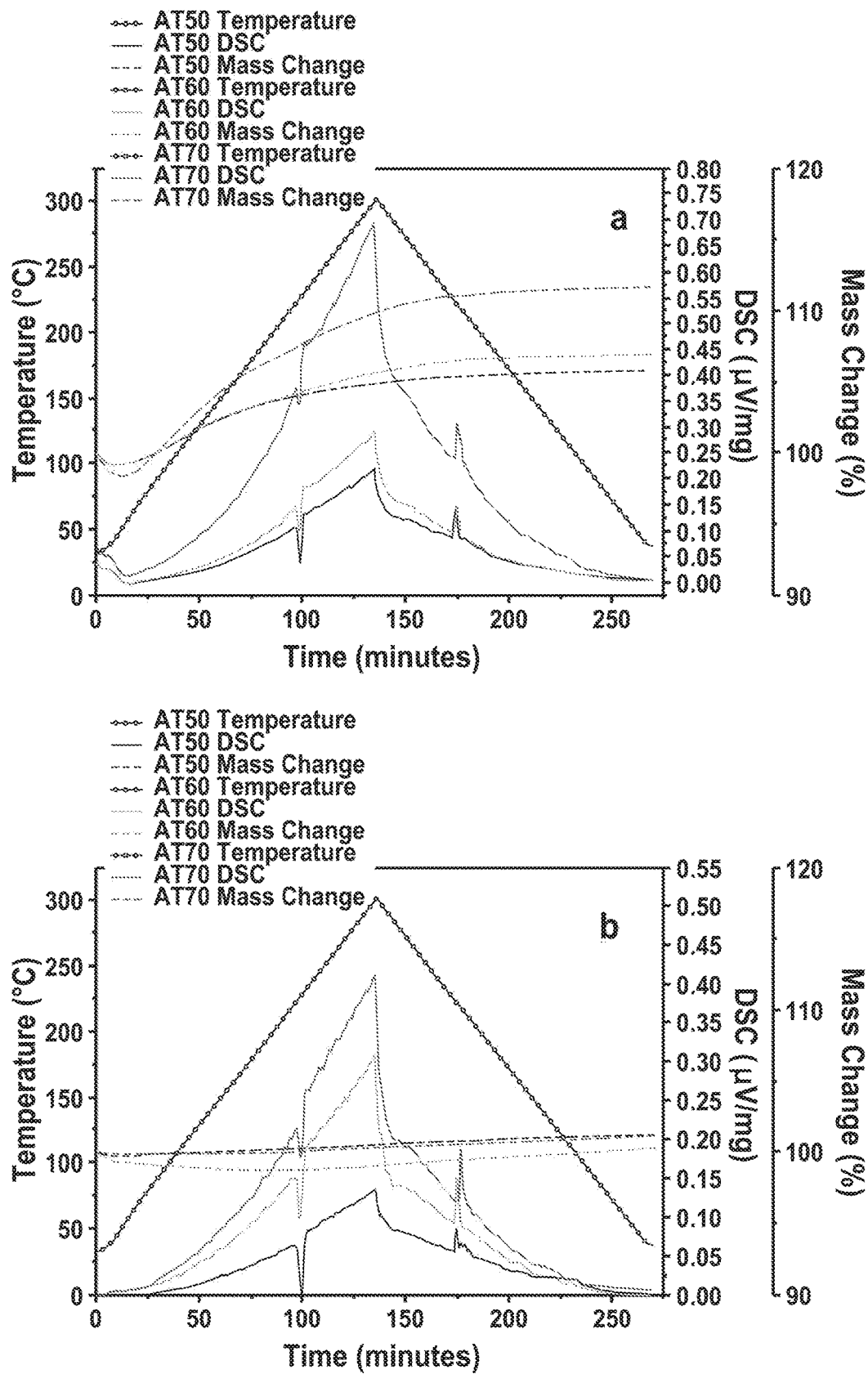
FIG. 5 depicts TGA/DSC results of heating AT alloys in a) air and b) argon atmospheres.

The combined metals can be rolled or otherwise shaped into a thin foil. The foil can have a thickness no greater than 0.25 mm, no greater than 0.20 mm, no greater than 0.15 mm, no greater than 0.125 mm, no greater than 0.1 mm, no greater than 0.075 mm, no greater than 0.05 mm, no greater than 0.04 mm, no greater than 0.03 mm, no greater than 0.02 mm, no greater than 0.01 mm, no greater than 0.005 mm, no greater than 0.0025 mm, no greater than 0.0020 mm, no greater than 0.001 mm, no greater than 0.0005 mm, or no greater than 0.0001 mm. In some instances, the foil can have a thickness from 0.0001-0.25 mm, from 0.001-0.1 mm, from 0.0025-0.1 mm, from 0.005-0.1 mm, from 0.01-0.1 mm, from 0.001-0.05 mm, or from 0.001-0.01 mm. Generally, the thickness of the metal solid will be reduced by a factor of at least 2, 3, 4, 5, 6, 7, 8, 9, 10, 100, 500, 1,000, 2,500, 5,000, 7,500, or even 10,000 in order to form the multiphase metallic foil anode. As a result, the foils have an average phase cross section in at least one spatial dimension of 20 microns or less, 10 microns or less, 8 microns or less, 6 microns or less, 5 microns or less, 4 microns or less, 3 microns or less, 2 microns or less, or 1 micron or less. SEM images of multiphase metallic anodes having such average phase cross sections may be seen in FIGS. 1, 3, 6, 15, 19, 21, and 24. FIG. 1A depicts a multiphase metallic foils which has been rolled from a metal ingot depicted in FIG. 1B. The vertical axis shows the dimension upon which the ingot underwent the greatest amount of reduction during rolling. FIG. 1B depicts a multiphase systems showing metals ingots prior to being rolled into foils. The SEM micrographs reveal an archetypical binary eutectic alloy. Specifically regarding the aluminum-tin alloys, primary aluminum dendrites were surrounded by eutectic tin with no noticeable separation of aluminum from tin in the eutectic. The observed microstructure met expectations based on the Al—Sn phase diagram given the hypoeutectic composition of the alloys as well as the location of the eutectic composition at 97.6 at % tin. The size scale of the aluminum and tin features seen in the micrographs of the as-cast ingots are on the order of tens of microns. The as-cast ingots were cold rolled anisotropically, such that there was an ~100-fold elongation along the y-axis, a corresponding 100-fold reduction along the z-axis, and little change along the x-axis, as seen in FIG. 1. The macroscopic deformation of the ingots into foil induced similar changes in the microstructure of the foils. Most importantly, the aluminum/tin feature sizes in the rolled foils were reduced to ~200 nm along the z-axis. The size reduction of the tin features is believed to be critical in allowing the tin particles to reversibly alloy with lithium without undergoing significant electrochemical milling.

In some embodiments, the anodes do not include any forms of carbon, e.g., graphite or graphene.

Multiphase metallic anodes can be advantageously employed in lithium ion cells. The cells also contain a cathode, for instance lithium cobalt oxide ($LiCoO_2$), lithium iron phosphate ($LiFePO_4$), lithium nickel manganese cobalt oxide ($LiNi_xMn_yCo_{1-x-y}O_2$), lithium manganese oxide ($LiMn_2O_4$), lithium cobalt nickel aluminum oxide ($LiCo_xNi_yAl_{1-x-y}O_2$), and an electrolyte such as mixtures of non-aqueous carbonate electrolytes such as propylene carbonate (PC), ethyl methyl carbonate (EMC), dimethyl carbonate (DMC), ethylene carbonate (EC), and/or monoflouroethylene carbonate (FEC) with salts such as lithium hexaflourophosphate ($LiPF_6$), lithium chlorate ($LiClO_4$), lithium bis(trifluoromethane)sulfonamide (LiTSFI) and/or lithium tetraborate ($LiBF_4$).

Multiphase metallic anodes can be advantageously employed in sodium ion cells. The cells can also contain a cathode such as Sodium cobalt oxide ($NaCoO_2$), sodium chromium oxide ($NaCrO_2$), sodium iron phosphate ($NaFePO_4$), sodium vanadium phosphate ($Na_3V_2(PO_4)_3$) and a previously mentioned carbonate electrolyte with a salt such as sodium chlorate ($NaClO_4$), sodium hexaflourophosphate ($NaPF_6$), and/or sodium tetraflouroborate ($NaBF_4$).

Multiphase metallic anodes can be advantageously employed in magnesium ion cells. The cells can also contain a cathode such as molybdenum sulfide ($Mo_6S_8$), magnesium manganese silicate ($MgMnSiO_4$), titanium disulfide ($TiS_2$), molybdenum sulfide ($MoS_2$), titanium selenide ($TiSe_2$), niobium sulfide ($NbS_3$), cobalt sulfide (CoS), manganese oxide ($MnO_2$), and/or molybdenum oxide ($MoO_3$) and a previously mentioned carbonate electrolytes with a salt such as magnesium perchlorate ($Mg(ClO_4)_2$), magnesium tetraflouroborate ($Mg(BF_4)_2$), magnesium bis(trifluoromethane)sulfonimide (MgTFSI).

Multiphase metallic anodes can be advantageously employed in calcium ion cells. The cells can also contain a cathode such as Manganese hexacyanoferrate ($Ca_{0.5}NaFe(CN)_6$), vanadium pentoxide ($V_2O_5$), calcium cobalt oxide ($CaCo_2O_4$) and a previously mentioned linear carbonate with a salt such as calcium hexaflourophosate $Ca(PF_6)_2$, and/or calcium perchlorate ($Ca(ClO_4)_2$).

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Al—Sn and Al—Zn—Sn Metal Foils

Approximately 50 g of the desired weight ratios of aluminum (McMaster-Carr, 1100 series>99.5%), zinc (RotoMetals, >99.7%), and tin (Metal Shipper Inc., >99.9%) were melted in air at 750° C. in a high temperature graphite crucible. The melt was then cast into a graphite mold and allowed to cool forming rectangular ingots approximately 35×13×7 mm in size. The foils were made by rolling sections of the ingots approximately 7×7×3.5 mm in size with a manual Durston rolling mill equipped with 60 mm diameter rollers. The rolling was performed such that the 3.5 mm dimension was reduced to 0.02-0.03 mm while elongation was focused on one of the 7 mm dimensions. Subsequent to rolling, some of the foils were annealed in either air or argon atmospheres at 185° C. for 1 h.

X-ray diffraction patterns were collected with a Bragg-Brentano type diffractometer (Rigaku Miniflex 600) using Copper Kα ($\lambda$=0.15418 nm) radiation. The scans were collected in continuous mode over a 2θ range of 10-100° 2θ at a rate of 3° s−1. Both the foils and ingots were mounted and polished using traditional metallographic sample preparation techniques prior to analysis in the SEM. Briefly, samples were first sectioned and mounted in a thermal set polymer (Beuhler, Inc., PhenoCure). The mounted samples were then polished first using 6 and 1 µm diamond suspensions followed by a final polish using an aqueous suspension of 0.1 µm alumina. The samples were then washed with water and ethanol and quickly dried. It should be noted that all of the alloys had a high degree of reactivity with water and the washing step etched the surface. There were no subsequent etching steps. Scanning electron micrographs were taken on a JEOL JSM-5610 operating at a 20 keV accelerating voltage. Energy dispersive X-ray spectroscopy elemental maps were generated with an Oxford Instruments INCAx-act detector. Inductively coupled plasma optical emission spectroscopy (ICP-OES) was performed on a Varian 715-ES to determine the stoichiometries of the various alloys. Approximately 10 mg of each of the rolled foils were dissolved in aqua regia and then diluted to a volume of 250 mL with de-ionized water. The Varaian 715-ES was calibrated with aluminum, zinc, and tin 10,000 ppm standard solutions (Ricca Chemical). Thermogravimetric analysis (TGA) was conducted with ~15 mg samples on a Jupiter STA 449 F3 in both air and argon atmospheres at a heating rate of 5° C./min.

Coin cells (CR 2032) were constructed to test the electrochemical characteristics of the as made foils. The foil strips (~20 µm thick) were punched into 12 mm disks weighing ~10 mg. Metallic lithium chips (MTI Corporation) were used as the counter electrode and glass fiber prefilters (Millipore APFA04700) were used as separators. The electrolyte used was a 3:7 ratio of monoflouro ethylene carbonate (FEC) to ethylene carbonate (EC) with 1 M bis(trifluoromethane)sulfonimide lithium (LiTSFI) and 3% vinylene carbonate (VC). The coin cells were constructed in an inert ($O_2$<5 ppm) dry ($H_2O$<1 ppm) glovebox with an argon atmosphere. Once assembled, galvanostatic charge discharge and cyclic voltammetry were performed with a BT-2000 Arbin instruments battery cycler. The first 3 cycles of the galvanostatic charge discharge testing were conditioning cycles in which a rate of C/10 was used without a lower voltage cutoff, but rather a capacity limited cutoff of 180, 240, 300, and 300 mAh/g were used, respectively, for the nominal capacity of 150, 200, 250, and 300 mAh/g cells. Subsequently, the cells were than cycled over a voltage range of 0.3 to 1.0 V. The cells that were tested to investigate the effect of annealing underwent two C/10 formation cycles followed by voltage and capacity limited cycling from 0.3 to 1.5 V and 300 mAh/g. Cyclic voltammetry was conducted after forming the cells using the same method as the 300 mAh/g galvanostatic charge discharge cells. The cyclic voltammograms were then collected with a sweep rate of 0.0005 V/s over two voltage ranges, namely 0.3 V to 1.5 V and 0 V to 1.5 V. Intermittent electrochemical impedance spectroscopy was performed on a Biologic VMP3 test system with fresh cells. The cells were cycled with the same methodology as the galvanostatic charge discharge cells, with the addition of a 1 h rest followed by an EIS sweep. The potentiostatic EIS was performed with a sinusoidal amplitude of 10 mV from 1 MHz to 0.01 Hz with six steps per decade.

Example 2: Additional Eutectics

Approximately 25 grams of zinc (RotoMetals, >99.7%) and 25 grams of tin (Metal Shipper Inc., >99.9%) were melted in air at 550° C. in a high temperature graphite crucible. The melt was than cast into a graphite mold and allowed to cool forming rectangular ingots approximately 35×13×7 mm in size.

The Sn—Pb ingots were synthesized as follows. Approximately 25 grams of tin (Metal Shipper Inc., >99.9%) and 25 grams of lead (Rotometals) were melted in air at 400° C. in a high temperature graphite crucible. The melt was than cast into a graphite mold and allowed to cool forming rectangular ingots approximately 35×13×7 mm in size.

The Sn—Bi ingots were synthesized as follows. Approximately 30 grams of tin (Metal Shipper Inc., >99.9%) and 20 grams of bismuth (RotoMetals, 99.99%) were melted in air at 350° C. in a high temperature graphite crucible. The melt was then cast into a graphite mold and allowed to cool forming rectangular ingots approximately 35×13×7 mm in size.

The Cu—Pb ingots were synthesized as follows. Approximately 40 grams of lead (Rotometals, 99.9%) and 10 grams of copper (RotoMetals, 99.99%) were melted in air at 1100° C. in a high temperature graphite crucible. The melt was then cast into a graphite mold and allowed to cool forming rectangular ingots approximately 35×13×7 mm in size.

The Al—Sn—Bi ingots were synthesized as follows. Approximately 35 grams of tin (Metal Shipper Inc., >99.9%), 15 grams of aluminum (McMaster-Carr, 1100 series>99.5%), and 10 grams of bismuth (Rotometals, 99.99%) were melted in air at 750° C. in a high temperature graphite crucible. The melt was then cast into a graphite mold and allowed to cool forming rectangular ingots approximately 35×13×7 mm in size.

The Al—Sn—Cd—Zn ingots were synthesized as follows. Approximately 30 grams of tin (Metal Shipper Inc., >99.9%), 12.5 grams of aluminum (McMaster-Carr, 1100 series>99.5%), and 5 grams of bismuth (Rotometals, 99.99%), and 5 grams of Cadmium (Rotometals, were melted in air at 750° C. in a high temperature graphite crucible. The melt was then cast into a graphite mold and allowed to cool forming rectangular ingots approximately 35×13×7 mm in size.

The foils were made by rolling sections of the ingots described above approximately 7×7×3.5 mm in size with a manual Durston rolling mill equipped with 60 mm diameter rollers. The rolling was performed such that the 3.5 mm dimension was reduced to 0.02-0.03 mm while elongation was focused on one of the 7 mm dimensions.

Example 3: Clad Sn—Cu Foils 7 grams of tin (Metal Shipper Inc., >99.9%) was rolled into a 0.7 mm foil and 3 grams of 0.01" copper wire (Copper Wire USA, 30 Gauge) woven into a tight Dutch weave. These were assembled with 5 layers alternating Cu/Sn/Cu/Sn/Cu to create a 3.3 mm stack, and rolled such that the 3.3 mm dimension was reduced to 0.02-0.03 mm.

Example 4: Plated Sn—Cu Foils

Three grams of copper wire (Copper Wire USA, 30 Gauge) were randomly oriented into a bird's nest configuration, saturated with flux (Oatey No. 5), and pressed into a puck 18 mm in diameter and 3.8 mm in height. Tin was heated in a crucible to 300° C. until completely melted. The puck was submerged in the liquid tin, and removed from the molten metal with tongs. The weight of the puck after tinning was ~8 g, and the volume remained consistent. The puck was then rolled such that the 3 mm dimension was reduced to 0.02-0.03 mm.

Example 5: Electrodeposition for IMFA Production

Three grams of steel wire was randomly oriented into a bird's nest configuration, and pressed into a puck 18 mm in diameter and 3.8 mm in height. This puck was submerged into an aqueous 1M copper (II) sulfate solution, and 5 micrometers of copper were electrodeposited on the surface of the steel. This puck was then dried, coated in flux, and plated with tin as previously described.

Example 6: Electroless Deposition for IMFA Production

Three grams of steel wire was randomly oriented into a bird's nest configuration, and pressed into a puck 18 mm in diameter and 3.8 mm in height. This puck was submerged into an aqueous 1M copper (II) sulfate solution, and formaldehyde was added such that 5 micrometers of copper were deposited upon the surface of the steel. The puck was then dried, coated in flux, and plated with tin as previously described.

Example 7: Dispersion of Active Nanoparticles into Alloy

Approximately 25 grams of the aluminum (McMaster-Carr, 1100 series>99.5%) and 25 grams of tin (Metal Shipper Inc., >99.9%) were melted in air at 750° C. in a high temperature graphite crucible. Two and one-half grams of 50 nanometer silicon nanoparticles were rapidly stirred into the melt, which was immediately cast into a graphite mold and allowed to cool, forming rectangular ingots approximately 35×13×7 mm in size. The ingots were processed as previously described.

Additionally, 3 grams of copper wire was randomly oriented into a bird's nest configuration, and saturated with flux containing 0.4 grams of 50 nm silicon nanoparticles. This wire pressed into a puck 18 mm in diameter and 3.8 mm in height. Tin was heated in a crucible to 350° C. until completely melted. The puck was submerged in the liquid tin, and removed from the molten metal with tongs. The weight of the puck after tinning was approximately 8.2 grams, and the volume remained consistent. The puck was then rolled such that the 3 mm dimension was reduced to 0.02-0.03 mm.

Example 8: Mechanical Incorporation of Active Nanoparticles into Alloy

The foils were made by rolling sections of Al—Sn ingots approximately 7×7×3.5 mm in size with a manual Durston rolling mill equipped with 60 mm diameter rollers. The rolling was performed such that the 3.5 mm dimension was reduced to 0.1 mm while elongation was focused on one of the 7 mm dimensions. At this point, a uniform layer of silicon nanoparticles drop cast on the foil, and the foil was folded in half. The uniaxial elongation was continued, and the process repeated, until the loading of silicon was calculated to be 5 wt % of the foil.

Example 9: Lithiation of IMFA

Approximately 4.5 grams of the aluminum (McMaster-Carr, 1100 series>99.5%), 4.5 grams of tin (Metal Shipper Inc., >99.9%), and 1 gram of lithium were melted under argon at 750° C. in a high temperature graphite crucible. The system was cooled under argon, and the resulting ingot was processed into a foil as previously described.

Lithium foil was clamped to Al—Sn eutectic foil, and holding the system at 50° C. under argon for 24 hours, after which time the lithium foil was removed from contact.

Chemical lithiation was performed by the condensation of anhydrous ammonia in an acetone/dry ice bath. One gram of Lithium metal was added to the ammonia and solvated by the bath to form a solvated lithium ammonia solution. Nine grams of metal foil was subsequently submerged in the bath, and the system was transferred to an ethanol-dry ice bath, and allowed to proceed to completion.

Electrochemical lithiation was performed by assembling the Al—Sn eutectic anode in a coin cell vs a lithium metal counter anode as described previously, and the IMFA was lithiated to $Li_{2.2}Sn$. The cell was then disassembled under argon, and the lithiated anode transferred to another fresh cell.

Results

Figure 6:
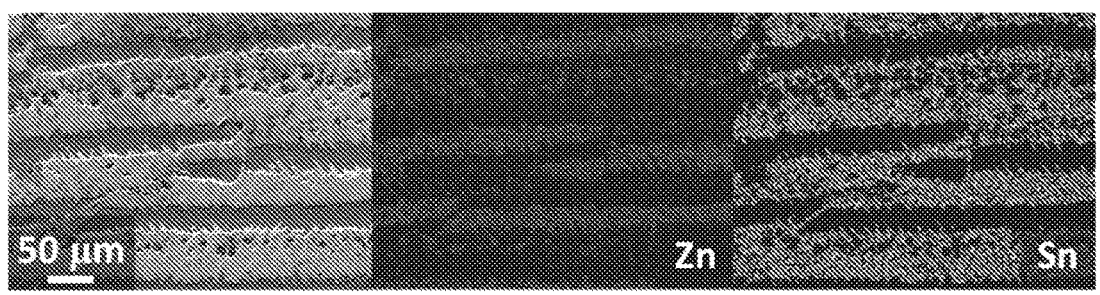
FIG. 6 depicts SEM micrographs and EDX elemental maps of Sn—Zn ingots, Tin is shown as red, and zinc as green in EDX elemental maps.
Figure 7:
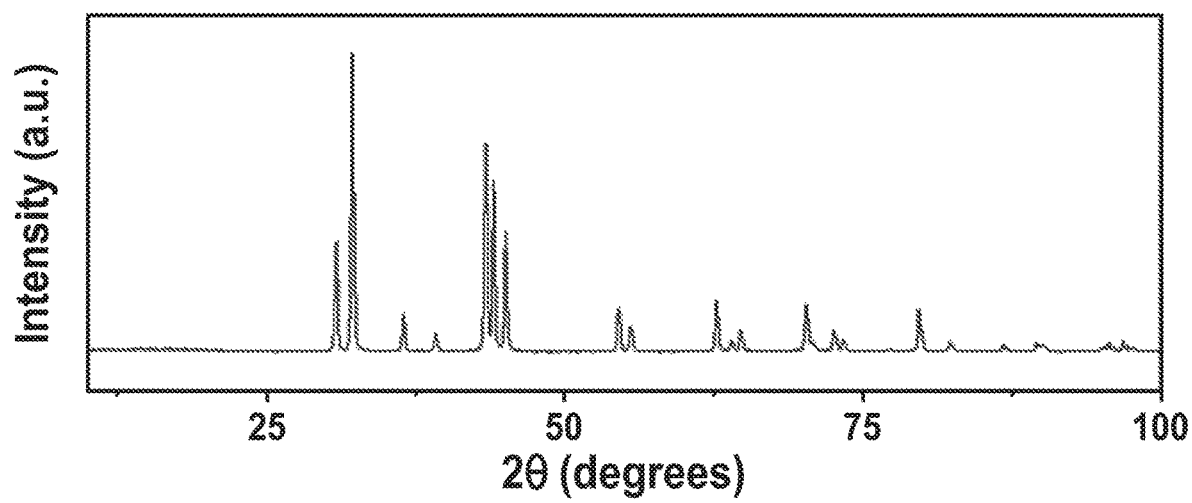
FIG. 7 depicts an X-ray diffraction spectrum of Sn—Zn foil.
Figure 8:
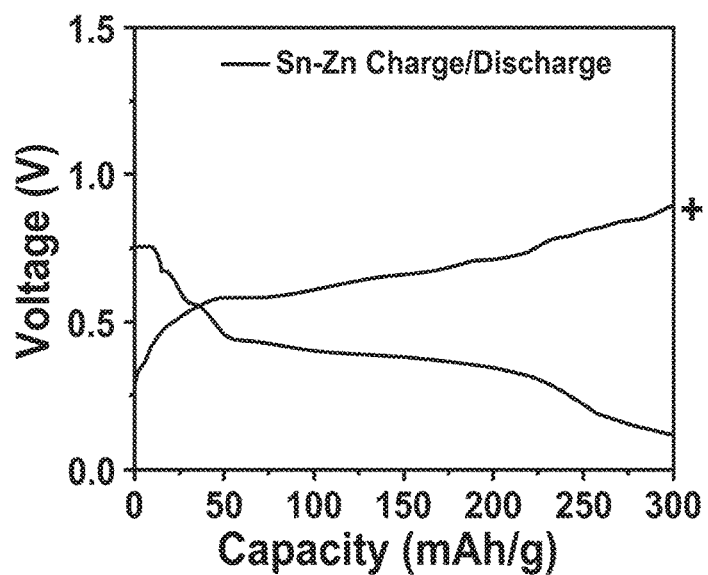
FIG. 8 depicts voltage profiles of Sn—Zn during the 5th charge/discharge at a rate of C/10.

The SEM micrographs of Sn—Zn reveal an archetypical binary eutectic alloy, shown in FIG. 6. Primary zinc dendrites were surrounded by eutectic tin with no noticeable separation of aluminum from tin in the eutectic. The observed microstructure met expectations based on the Zn—Sn phase diagram given the hypoeutectic composition of the alloys as well as the location of the eutectic composition at 92 wt % tin. The size scale of the zinc and tin features seen in the micrographs of the as-cast ingots are on the order of tens of microns. This complete segregation was confirmed with X-ray diffraction, with peaks corresponding to two crystalline metallic phases and no observed intermetallics or impurities. X-ray spectra can be observed in FIG. 7.

Figure 9:
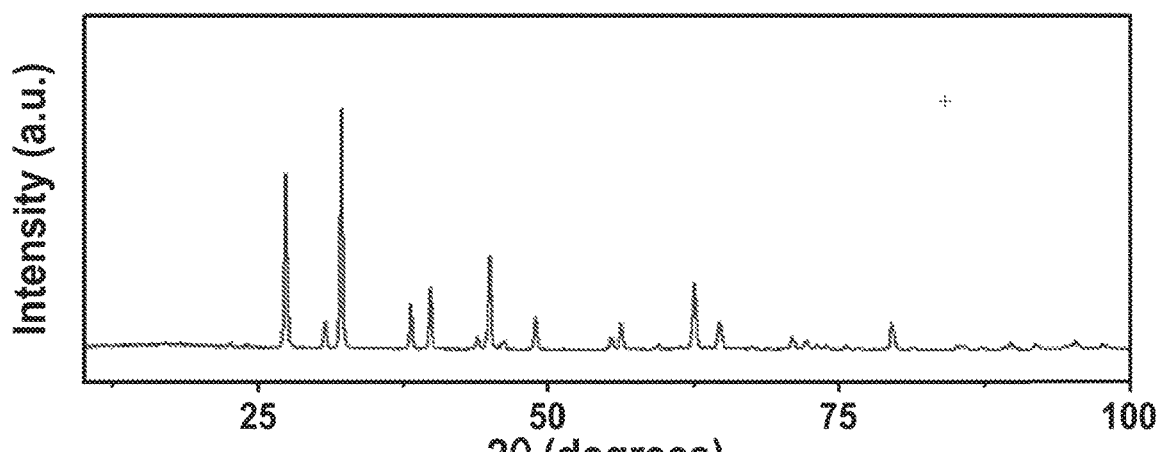
FIG. 9 depicts an X-ray diffraction spectrum of Sn—Bi foil.

After the Sn—Zn ingots were processed into foils, half cells were assembled as described previously. The Zn—Sn foils were cycled at 300 mA/g at a rate of C/10. The $5^{th}$ charge and discharge curve can be seen in FIG. 9. Excellent utilization of tin was observed when compared to other binary eutectic systems.

Figure 10:
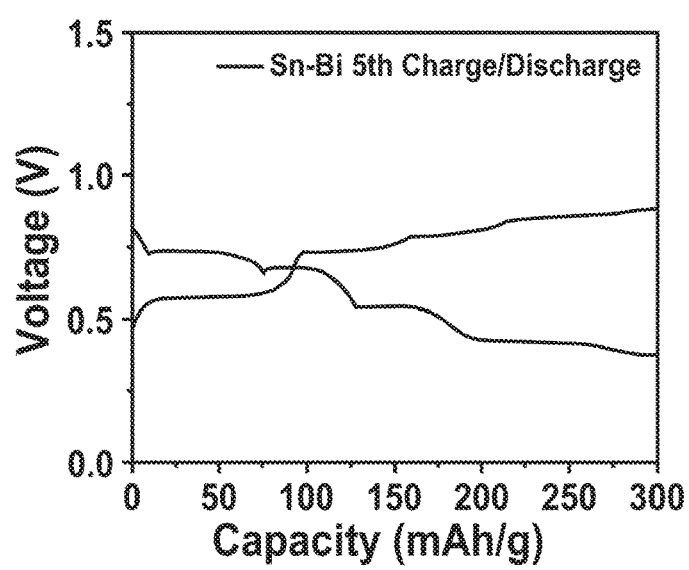
FIG. 10 depicts voltage profiles of Sn—Bi during the 5th charge/discharge at a rate of C/10.

Sn—Bi foils were characterized using X-ray diffraction, and complete segregation into two metallic phases was observed. The x-ray spectrum can be found in FIG. 9. When assembled into half cells, lithiation of the bismuth was observed to occur at 0.78V, and the plateaus overlapped with the lithiation of tin. The $5^{th}$ charge/discharge curve of the Sn—Bi foils is shown in FIG. 10.

Figure 11:
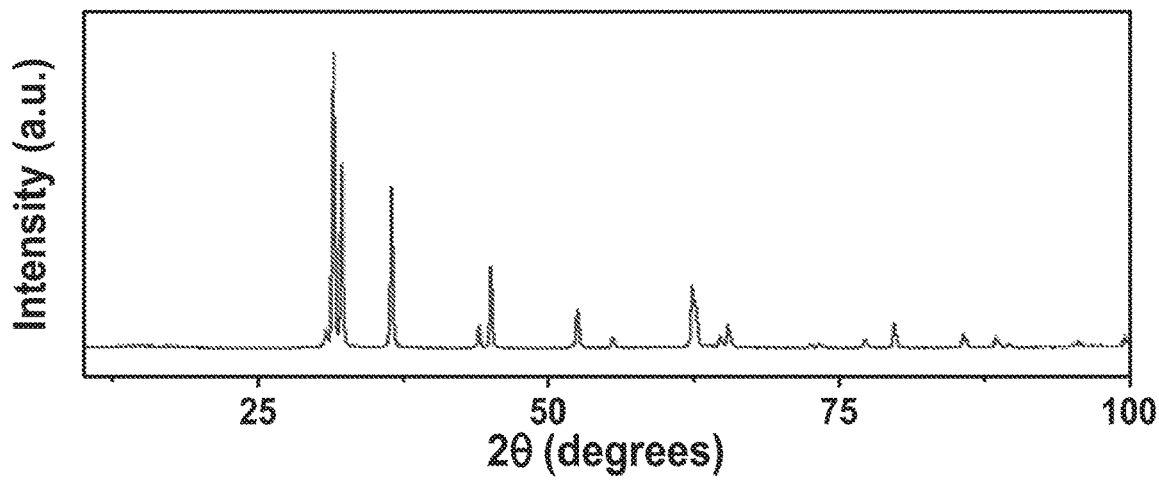
FIG. 11 depicts an X-ray diffraction spectrum of Sn—Pb foil
Figure 12:
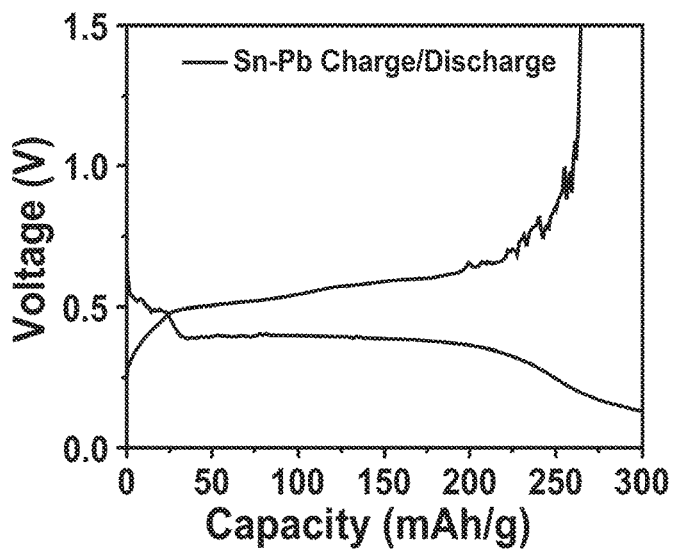
FIG. 12 depicts voltage profiles of Sn—Pb during the 5th charge/discharge at a rate of C/10.

Sn—Pb foils were characterized using X-ray diffraction, and complete segregation into two metallic phases was observed. The x-ray spectrum can be found in FIG. 11. When assembled into half cells, lithiation of the lead occurred in the sloping plateau present at 0.4V. The $5^{th}$ charge/discharge curve of the Sn—Pb foils is shown in FIG. 12.

Figure 13:
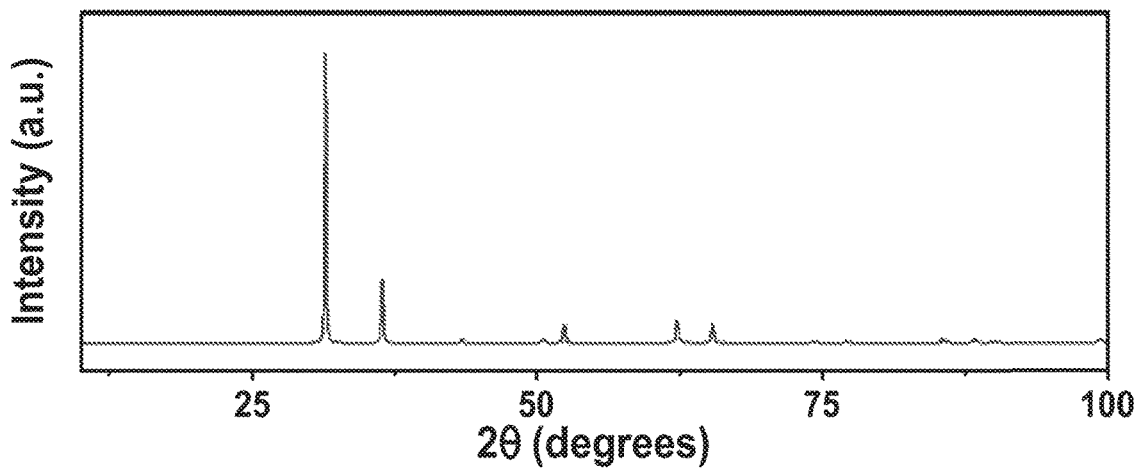
FIG. 13 depicts an X-ray diffraction spectrum of Cu—Pb foil.
Figure 14:
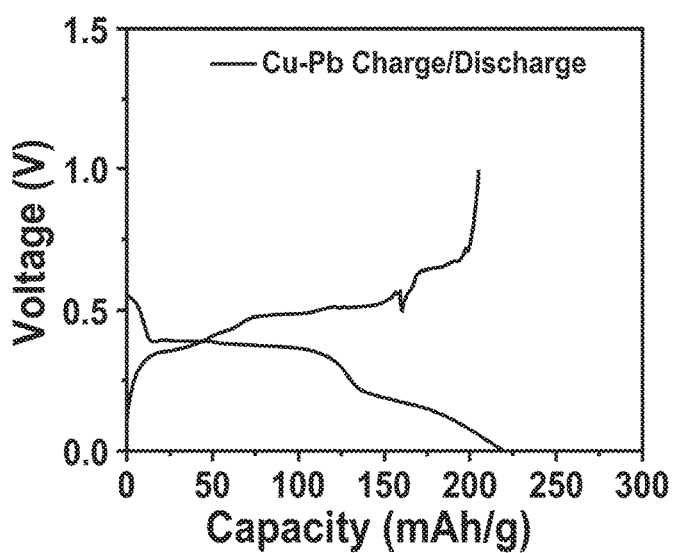
FIG. 14 depicts voltage profiles of Cu—Pb during the 3rd charge/discharge at a rate of C/10.

Cu—Pb foils were characterized using X-ray diffraction, and complete segregation into two metallic phases was observed. The x-ray spectrum can be found in FIG. 13. When assembled into half cells, lithiation of the lead was observed to occur at 0.4V. No plateaus were attributed to the copper matrix. The $3^{rd}$ charge/discharge curve of the Sn—Bi foils is shown in FIG. 14.

Figure 15:
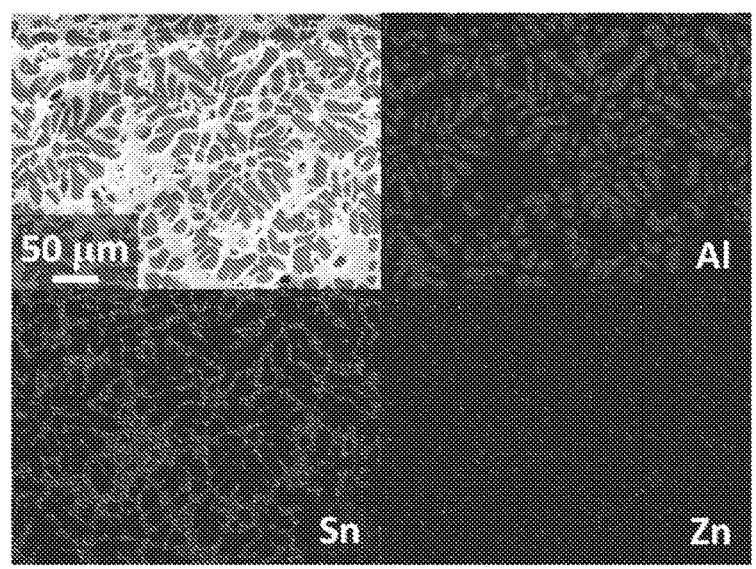
FIG. 15 depicts SEM micrographs and EDX elemental maps of Al—Zn—Sn ingots, Tin is shown as red, aluminum as green, and zinc as blue in EDX elemental maps.
Figure 16:
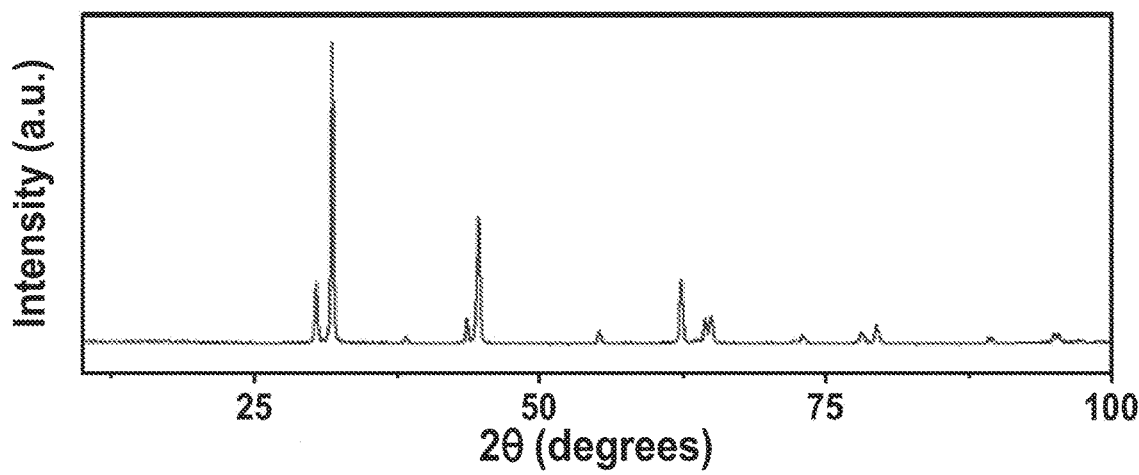
FIG. 16 depicts an X-ray diffraction spectrum of Al—Zn—Sn foil.

The SEM micrographs of Al—Zn—Sn reveal an archetypical binary eutectic alloy, shown in FIG. 15, with each phase containing a solid solution of zinc. Primary aluminum rich dendrites were surrounded by eutectic tin-rich regions with no noticeable separation of aluminum from tin in the eutectic. The observed microstructure suggested the zinc preferentially segregated into the tin-rich phase. The size scale of the aluminum and tin features seen in the micrographs of the as-cast ingots are on the order of tens of microns. This segregation was confirmed with X-ray diffraction with peaks corresponding to two crystalline metallic phases, with a lattice parameter shift resultant from the presence of zinc. No observed intermetallics or impurities X-ray spectra can be observed in FIG. 16.

Figure 17:
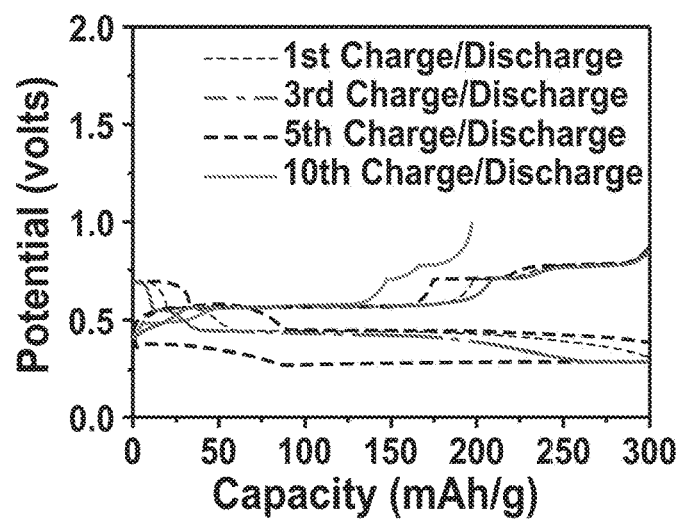
FIG. 17 depicts Voltage profiles of Al—Zn—Sn during various charges and discharges at a rate of C/10.

When assembled into half cells, lithiation of the tin was observed as expected. Charge/discharge curves can be found in FIG. 17.

Figure 18:
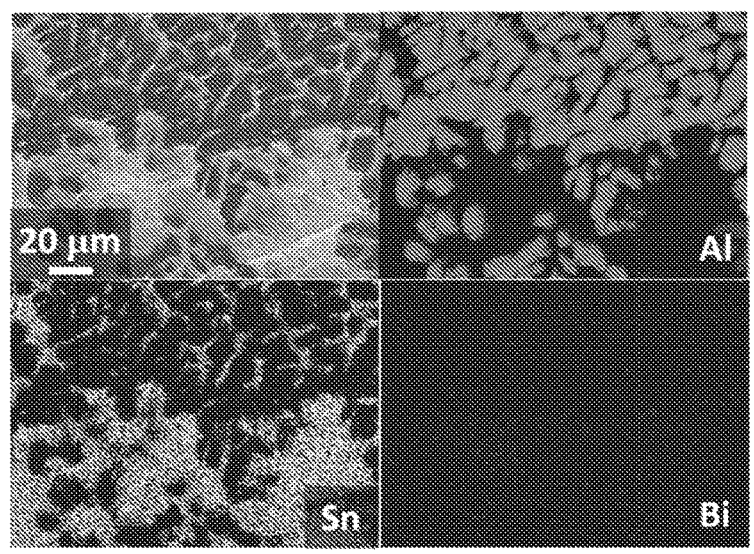
FIG. 18 depicts SEM micrographs and EDX elemental maps of Al—Sn—Bi ingots at 20 μm resolution.
Figure 19:
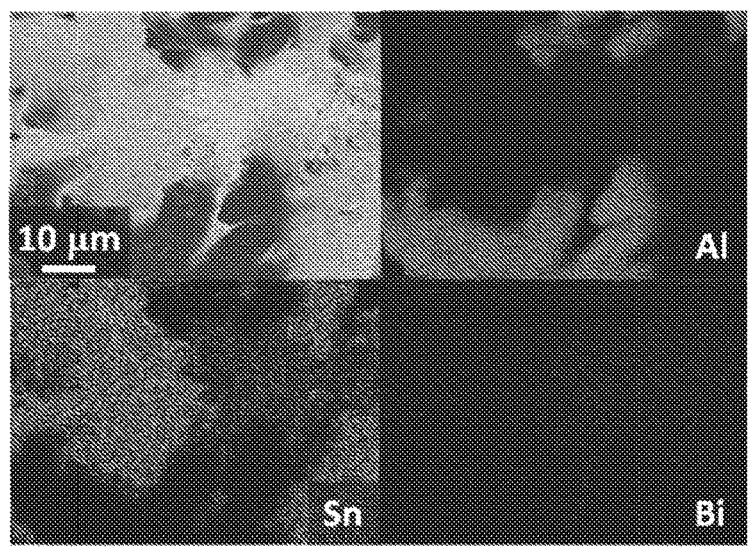
FIG. 19 depicts SEM micrographs and EDX elemental maps of Al—Sn—Bi ingots at 10 μm resolution.
Figure 20:
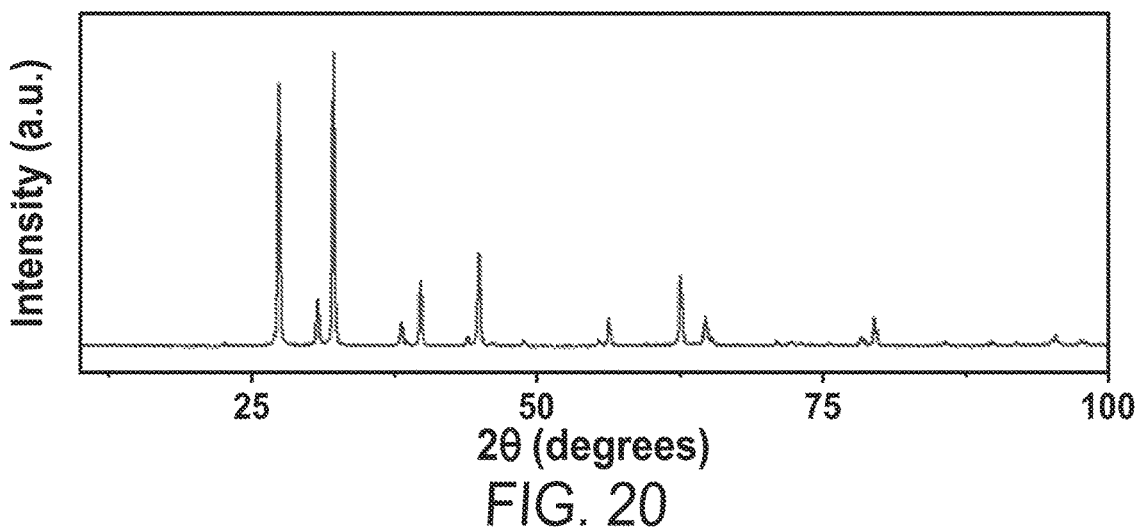
FIG. 20 depicts an X-ray diffraction spectrum of Al—Sn—Bi foil.

The SEM micrographs of Al—Sn—Bi reveal a multiscale eutectic alloy, shown in FIGS. 18 and 19. Primary micron scale aluminum dendrites were surrounded by regions rich in bismuth and tin, with no noticeable separation of aluminum into the biphasic Sn—Bi region. Closer inspection of the Sn—Bi region reveals a further interdigitated eutectic morphology, with features<1 micron. The size scale of the aluminum features seen in the micrographs of the as-cast ingots are on the order of tens of microns. This complete segregation was confirmed with X-ray diffraction, with peaks corresponding to three crystalline metallic phases and no observed intermetallics or impurities. X-ray spectra can be observed in FIG. 20.

Figure 21:
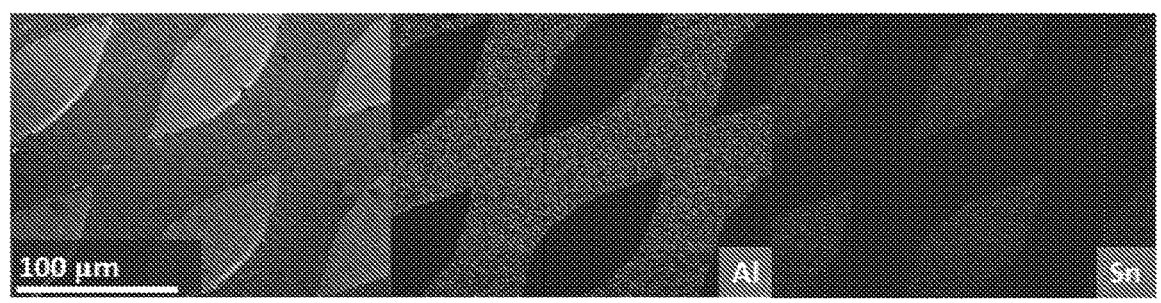
FIG. 21 depicts SEM micrographs and EDX elemental maps of Sn—Cu clad foils. Copper is shown as green, and tin as red in EDX elemental maps.
Figure 22:
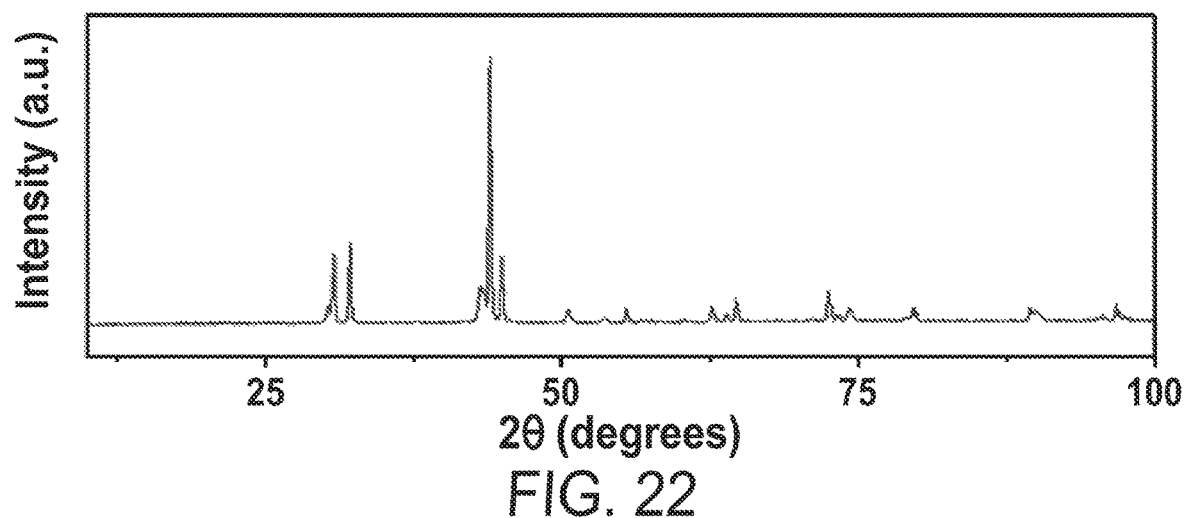
FIG. 22 depicts an X-ray diffraction spectrum of Sn—Cu cladded foil.

The SEM micrographs of the Sn—Cu clad in FIG. 21 reveal an even incorporation of the tin into copper, with complete segregation of phases. This complete segregation was confirmed with X-ray diffraction, with peaks corresponding to two crystalline metallic phases and no observed intermetallics or impurities. X-ray spectra can be observed in FIG. 22.

Figure 23:
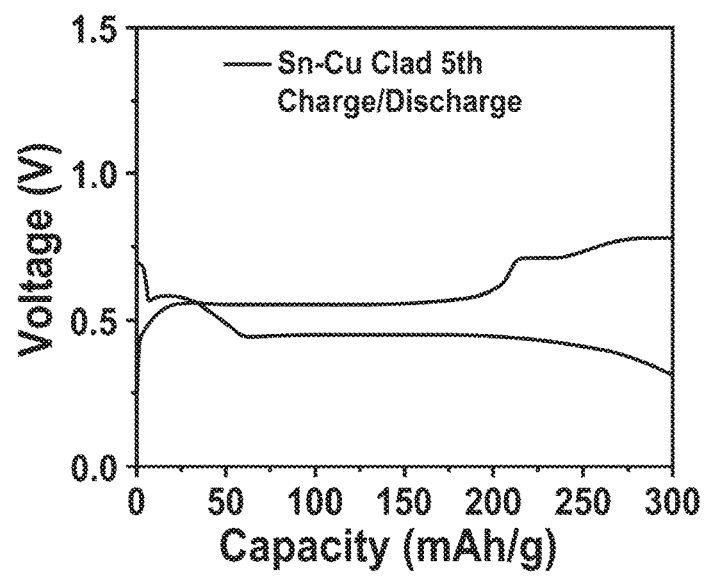
FIG. 23 depicts voltage profiles of Sn—Cu cladded foils during the 5th charge/discharge at a rate of C/10.

When assembled into half cells, lithiation of the tin was observed as expected. No capacity was attributed to the inert copper matrix. The $5^{th}$ charge/discharge curve of the Sn—Cu cladded foils is shown in FIG. 23.

Figure 24:
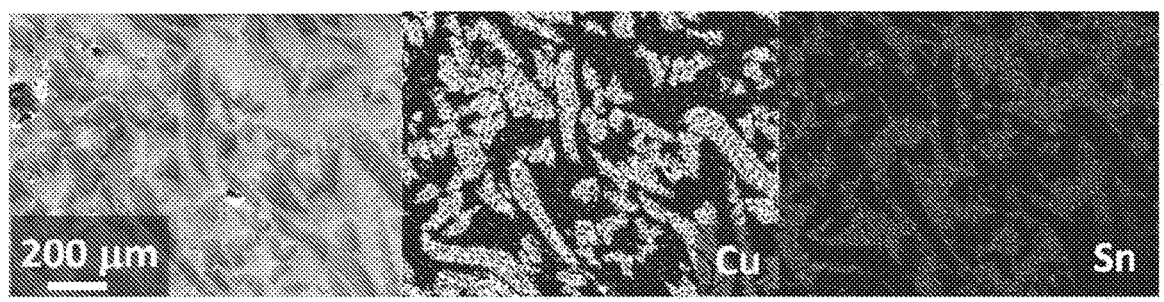
FIG. 24 depicts SEM micrographs and EDX elemental maps of Sn plated Cu, Tin is shown as red, and copper as green in EDX elemental maps.
Figure 25:
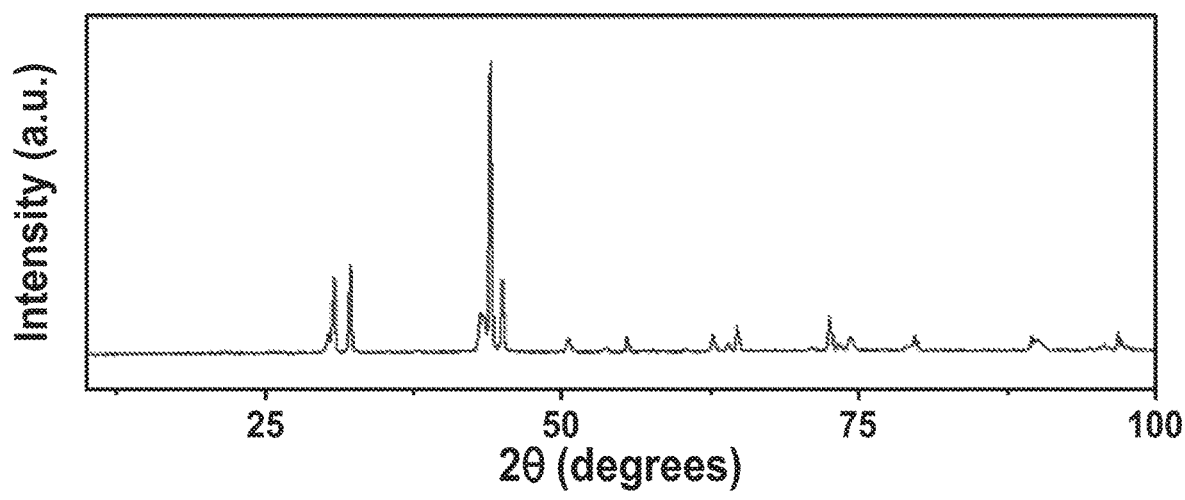
FIG. 25 depicts an X-ray diffraction spectrum of Sn plated Cu foil.

The SEM micrographs of the tin plated copper substrate reveal microscopic tin nucleated around a copper matrix, shown in FIG. 24. Primary copper wiring is surrounded by pure tin phases, an analogous system to the previously observed binary eutectics, with features on the order of 10-100 micron. This complete segregation was confirmed with X-ray diffraction, with peaks corresponding to two crystalline metallic phases and no observed intermetallics or impurities. X-ray spectra can be observed in FIG. 25.

Figure 26:
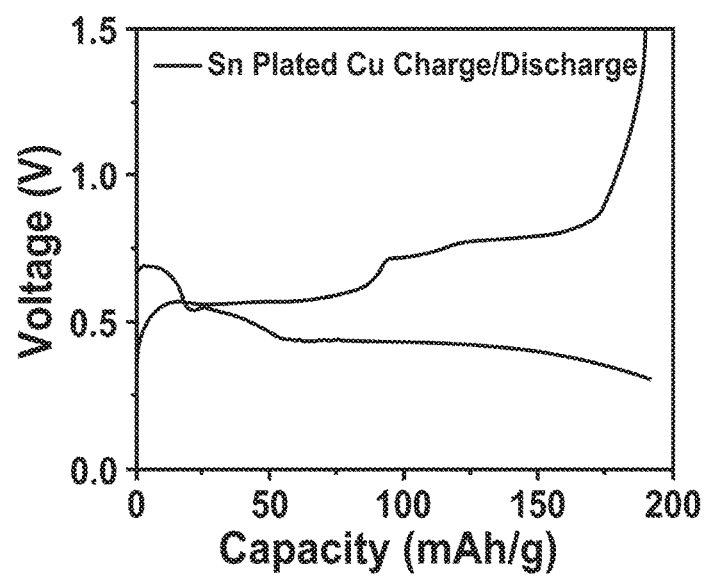
FIG. 26 depicts voltage profiles of Sn plated Cu foils during the 5th charge/discharge at a rate of C/10.
Figure 27:
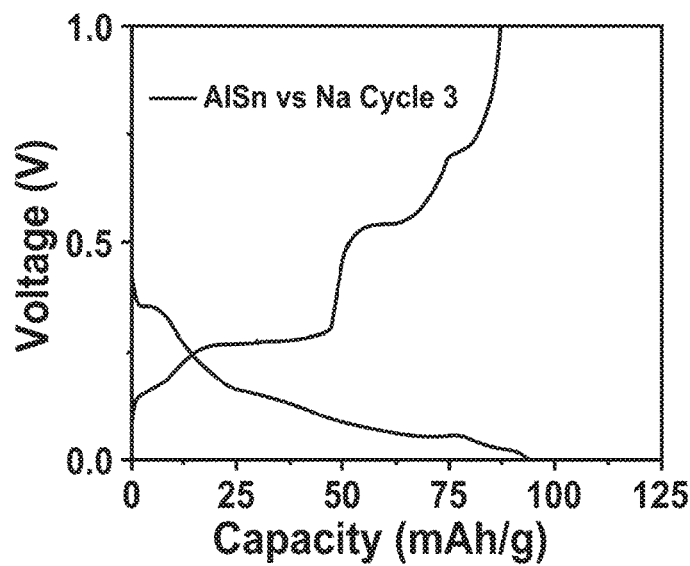
FIG. 27 depicts the voltage profile for sodiation of a Al—Sn anode during the 5th charge/discharge at a rate of C/10.
Figure 28:
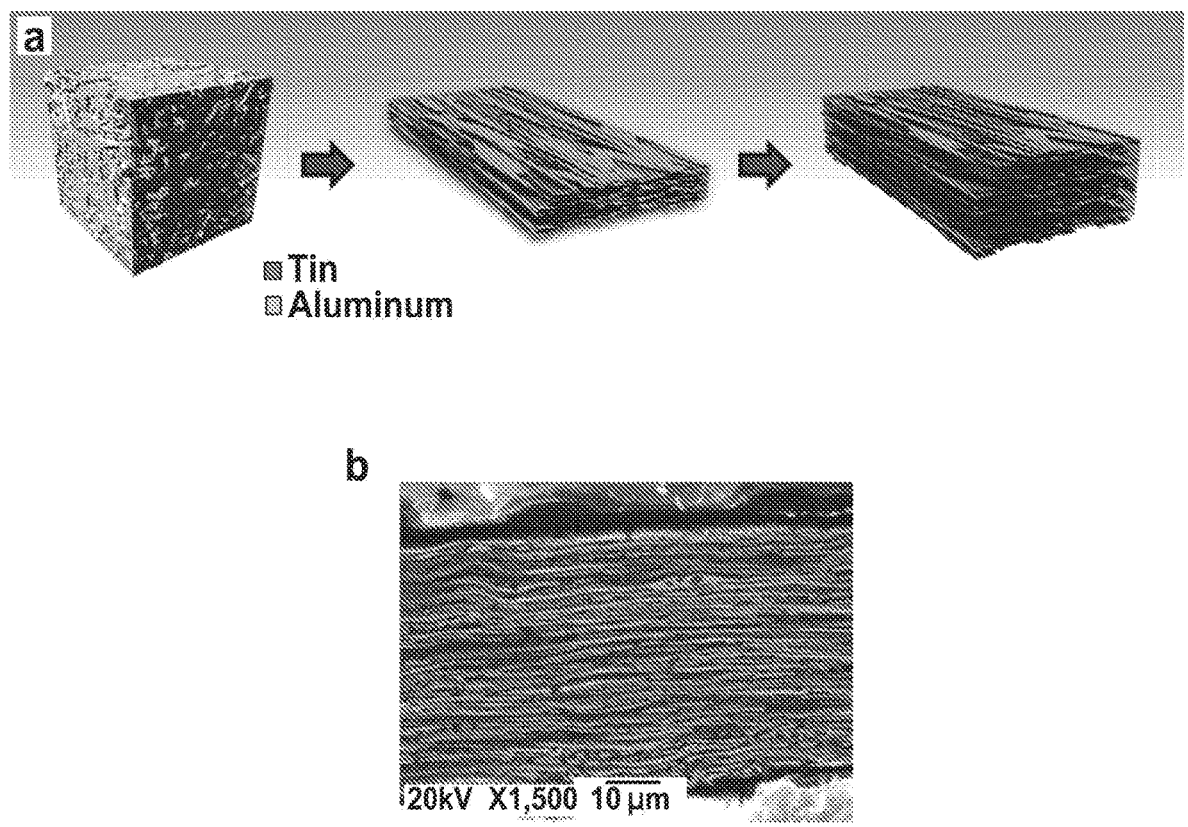
FIG. 28 depicts (a) illustration of the cast ingot, rolled into a foil, and subsequent lithiation of the tin portion of the foil. (b) SEM micrograph of the Aluminum-tin IdEA Anode at 1500× magnification. (c) long term cycling data of the Al—Sn IdEA anode cycled at 250 mAh/g at a rate of C/10.
Figure 28:
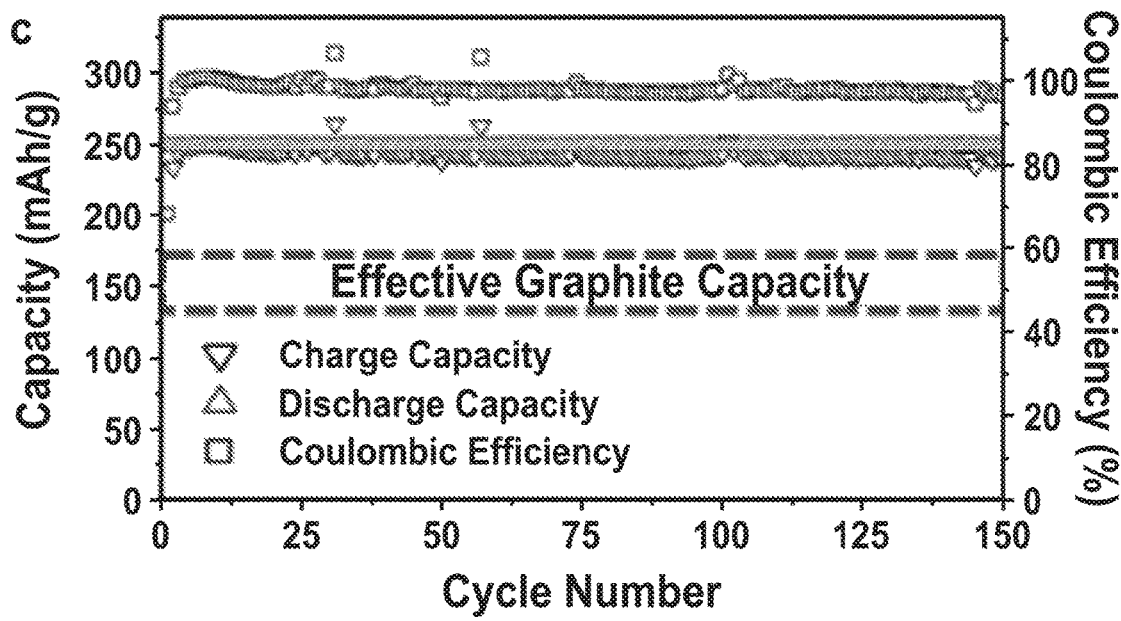
Figure 29:
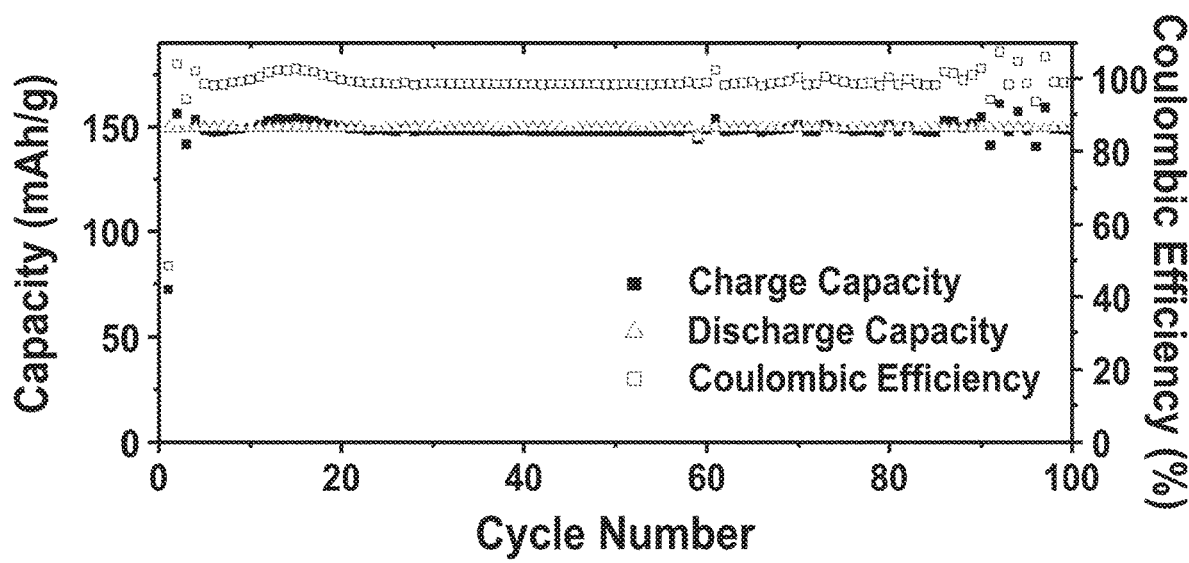
FIG. 29 depicts cycling data of a $Sn_{0.545}Zn_{0.0445}Bi_{0.01}$ foil.
Figure 30:
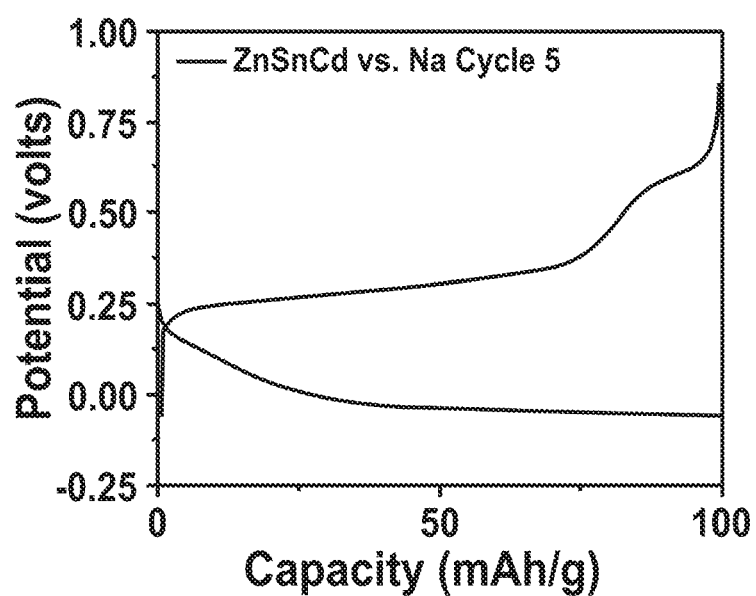
FIG. 30 depicts represents the 5th sodiation/desodiation (discharge/charge) of a $Zn_{58}Sn_{40}Cd_2$ anode cycled vs. metallic sodium.

When assembled into half cells, lithiation of the tin was observed as expected. No capacity was attributed to the inert copper matrix. The $5^{th}$ charge/discharge curve of the Sn plated Cu foils is shown in FIG. 26.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. An anode comprising:
    an anode active material, wherein the anode active material is an integrated multiphase metallic foil, wherein the integrated multiphase metallic foil is a rolled foil and wherein the integrated multiphase metallic foil comprises:
        a first metal phase comprising an active metal that alloys with an alkali metal or an alkaline earth metal at a first alloying potential; and
        a second metal phase comprising a conductive metal that alloys with the alkali metal or the alkaline earth metal at a second alloying potential, wherein the first alloying potential is greater than the second alloying potential.

2. The anode of claim 1, wherein the alkali metal is lithium or sodium and wherein the alkaline earth metal is magnesium or calcium.

3. The anode of claim 1 wherein the active metal is aluminum, silicon, zinc, gallium, silver, cadmium, indium, tin, antimony, gold, lead, bismuth, or magnesium.

4. The anode of claim 1, wherein the conductive metal is nickel, aluminum, zinc, silicon, lead, germanium, bismuth, silver, cadmium, antimony, copper, or gold.

5. The anode of claim 1, wherein the active metal is tin, wherein the alkali metal is lithium, and wherein the conductive metal is aluminum.

6. The anode of claim 1, wherein the integrated multiphase metal foil is characterized by a weight ratio of the active metal to the conductive metal of from 1:10 to 10:1.

7. The anode of claim 1, wherein the first metal phase or the second metal phase further comprises at least one additional element, different from the active metal and the conductive metal, selected from the group consisting of boron, carbon, aluminum, silicon, phosphorous, gallium, germanium, arsenic, indium, antimony, lead, tin, bismuth, titanium, vanadium, chromium, manganese, iron, cobalt, nickel, copper, zinc, yttrium, zirconium, niobium, molybdenum, technetium, ruthenium, rhodium, palladium, silver, cadmium, tungsten, osmium, iridium, platinum, gold, and combinations thereof.

8. The anode of claim 7, wherein the at least one additional element is present in the integrated multiphase metal foil in an amount from 0.1-10% by weight.

9. The anode of claim 1, wherein the integrated multiphase metallic foil comprises a eutectic alloy or hypoeutectic alloy of the active metal and the conductive metal.

10. The anode of claim 1, wherein the integrated multiphase metallic foil comprises a cladded foil of the active metal and the conductive metal.

11. The anode of claim 1, wherein the integrated multiphase metallic foil is an anisotropically cold-rolled foil.

12. The anode of claim 1, wherein the integrated multiphase metallic foil has a thickness no greater than 0.05 mm.

13. The anode of claim 1, wherein the integrated multiphase metallic foil has an average phase cross section in at least one spatial dimension of 20 microns or less, 10 microns or less, 8 microns or less, 6 microns or less, 5 microns or less, 4 microns or less, 3 microns or less, 2 microns or less, or 1 micron or less.

14. The anode of claim 1, wherein the first metal phase further comprises lithium alloyed with the active metal.

15. The anode of claim 1, wherein the first metal phase further comprises sodium alloyed with the active metal.

16. A lithiated anode, prepared by a process comprising applying a voltage to a multiphase metallic electrode in contact with a lithium-containing electrolyte,
   wherein the multiphase metallic electrode comprises the anode of claim 1,
   wherein, at the voltage, the active metal is preferentially alloyed with lithium.

17. An electrochemical cell comprising:
   the anode of claim 1;
   a cathode; and
   an electrolyte.

18. The anode of claim 1,
   wherein the anode does not include a separate current collector; or
   wherein the anode further comprises an anode current collector in electrical contact with the anode active material.

19. A method of making an anode, comprising:
   forming a mixed metal precursor comprising an active metal and a conductive metal, and
   rolling the mixed metal precursor to a thickness no greater than 0.05 mm to generate an integrated multiphase metallic foil, wherein the integrated multiphase metallic foil is a rolled foil and wherein the integrated multiphase metallic foil comprises:
      a first metal phase comprising an active metal that alloys with an alkali metal or an alkaline earth metal at a first alloying potential; and
      a second metal phase comprising a conductive metal that alloys with the alkali earth metal or the alkaline earth metal at a second alloying potential, wherein the first alloying potential is greater than the second alloying potential.

20. The method claim 19, wherein the mixed metal precursor is formed by combining the active metal and the conductive metal in a melted state, followed by cooling to give the mixed metal precursor.

* * * * *